US008587831B2

(12) United States Patent
Muto et al.

(10) Patent No.: US 8,587,831 B2
(45) Date of Patent: Nov. 19, 2013

(54) MEDIA-DEPENDENT IMAGE PROCESSING

(75) Inventors: Hiroyuki Muto, Kawasaki (JP); Kazushige Hatori, Saitama (JP); Kenji Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 13/061,680

(22) PCT Filed: Sep. 28, 2009

(86) PCT No.: PCT/JP2009/067286
§ 371 (c)(1),
(2), (4) Date: Mar. 1, 2011

(87) PCT Pub. No.: WO2010/038881
PCT Pub. Date: Apr. 8, 2010

(65) Prior Publication Data
US 2011/0149319 A1    Jun. 23, 2011

(30) Foreign Application Priority Data
Oct. 2, 2008    (JP) .................................. 2008-257788

(51) Int. Cl.
*G06K 15/02* (2006.01)
(52) U.S. Cl.
USPC ............ 358/1.9; 358/3.24; 358/518; 382/167
(58) Field of Classification Search
None
See application file for complete search history.

(56) References Cited

U.S. PATENT DOCUMENTS

| | | | |
|---|---|---|---|
| 5,740,079 A * | 4/1998 | Shigemori et al. ............ | 356/402 |
| 6,717,672 B2 | 4/2004 | Tamagawa | |
| 7,697,167 B2 | 4/2010 | Hatori ............................. | 358/2.1 |
| 2002/0071120 A1 | 6/2002 | Tamagawa ..................... | 356/402 |
| 2004/0212816 A1* | 10/2004 | Tanabe et al. .................. | 358/1.9 |
| 2005/0019603 A1 | 1/2005 | Kathirgamanathan | |
| 2007/0258102 A1 | 11/2007 | Bielak et al. .................... | 358/1.9 |
| 2009/0225340 A1 | 9/2009 | Hatori ............................. | 358/1.9 |

(Continued)

FOREIGN PATENT DOCUMENTS

| | | |
|---|---|---|
| EP | 0732577 | 9/1996 |
| EP | 1267217 | 12/2002 |

(Continued)

OTHER PUBLICATIONS

U.S. Appl. No. 13/061,683, filed Mar. 1, 2011 by Kenji Baba, et al.

(Continued)

*Primary Examiner* — Barbara Reinier
(74) *Attorney, Agent, or Firm* — Fitzpatrick, Cella, Harper & Scinto

(57) ABSTRACT

It is difficult to appropriate estimate the colorimetric values of an arbitrary patch at a desired temperature with respect to an arbitrary medium in consideration of the influence of a fluorescent whitening agent contained in the medium. Target patch colorimetric values obtained when patches of a plurality of colors formed on a medium using color samples are measured at a target temperature designated in step S101. This estimation is implemented when both media-dependent variation correction processing (S102) that estimates patch colorimetric values based on the temperature characteristics of the medium, and toner-dependent variation correction processing (S103) that estimates patch colorimetric values based on the temperature characteristics of the color samples are executed. By correcting image data whose image is to be formed based on the target patch colorimetric values (S104), an arbitrary color patch on an arbitrary medium can be coped with.

28 Claims, 11 Drawing Sheets

(56) References Cited

U.S. PATENT DOCUMENTS

| | | | |
|---|---|---|---|
| 2010/0053647 A1 | 3/2010 | Baba | 358/1.9 |
| 2010/0053652 A1 | 3/2010 | Hatori et al. | 358/1.9 |
| 2010/0053653 A1 | 3/2010 | Hatori et al. | 358/1.9 |
| 2010/0086201 A1 | 4/2010 | Muto et al. | 382/162 |
| 2011/0102821 A1 | 5/2011 | Baba | 358/1.9 |

FOREIGN PATENT DOCUMENTS

| | | |
|---|---|---|
| EP | 2173086 | 4/2010 |
| EP | 2351349 | 8/2011 |
| JP | 9-184762 | 7/1997 |
| JP | 2000-88651 | 3/2000 |
| JP | 2002-139381 | 5/2002 |
| JP | 3555706 | 8/2004 |
| JP | 2005-507330 | 3/2005 |
| JP | 3776492 | 5/2006 |
| JP | 2008-60719 | 3/2008 |
| WO | 2010/038880 | 4/2010 |

OTHER PUBLICATIONS

European Search Report dated Jun. 4, 2012 in corresponding European Application No. EP 09817912.0.

* cited by examiner

F I G. 5A

| STORAGE UNIT | | | | | | | | | |
|---|---|---|---|---|---|---|---|---|---|
| MEDIA-DEPENDENT VARIATION-CORRECTED DATA | TEMPER-ATURE | C | M | Y | K | 380[nm] | 390[nm] | ...... | 780[nm] |
| MEDIUM WHITE | $T_t$ | 0 | 0 | 0 | 0 | 0.2620 | 0.3120 | ...... | 0.7719 |
| PATCH | $T_t$ | 0 | 0 | 10 | 0 | 0.0352 | 0.0359 | ...... | 0.7278 |
| | $T_t$ | 0 | 0 | 20 | 0 | 0.0291 | 0.0312 | ...... | 0.5080 |
| | $T_t$ | 0 | 0 | 30 | 0 | 0.0251 | 0.0280 | ...... | 0.5379 |
| | ... | ... | ... | ... | ... | ... | ... | ... | ... |
| | $T_t$ | 100 | 100 | 90 | 100 | 0.0796 | 0.0818 | ...... | 0.6761 |
| | $T_t$ | 100 | 100 | 100 | 100 | 0.0725 | 0.0801 | ...... | 0.7622 |
| TONER-DEPENDENT VARIATION-CORRECTED DATA | TEMPER-ATURE | C | M | Y | K | 380[nm] | 390[nm] | ...... | 780[nm] |
| MEDIUM WHITE | $T_t$ | 0 | 0 | 0 | 0 | 0.2628 | 0.3126 | ...... | 0.7719 |
| PATCH | $T_t$ | 0 | 0 | 10 | 0 | 0.0358 | 0.0365 | ...... | 0.7278 |
| | $T_t$ | 0 | 0 | 20 | 0 | 0.0297 | 0.0319 | ...... | 0.5080 |
| | $T_t$ | 0 | 0 | 30 | 0 | 0.0258 | 0.0286 | ...... | 0.5379 |
| | ... | ... | ... | ... | ... | ... | ... | ... | ... |
| | $T_t$ | 100 | 100 | 90 | 100 | 0.0801 | 0.0880 | ...... | 0.6761 |
| | $T_t$ | 100 | 100 | 100 | 100 | 0.0730 | 0.0806 | ...... | 0.7622 |

FIG. 5B

| MEASURED DATA | TEMPERATURE | C | M | Y | K | 380[nm] | 390[nm] | ... | 780[nm] |
|---|---|---|---|---|---|---|---|---|---|
| MEDIUM WHITE | $T_{m1}$ | 0 | 0 | 0 | 0 | 0.2628 | 0.3127 | ... | 0.7719 |
|  | $T_{m2}$ | 0 | 0 | 0 | 0 | 0.2576 | 0.3086 | ... | 0.7739 |
| PATCH | $T_{m2}$ | 0 | 0 | 10 | 0 | 0.0358 | 0.0365 | ... | 0.7278 |
|  | $T_{m2}$ | 0 | 0 | 20 | 0 | 0.0297 | 0.0318 | ... | 0.5080 |
|  | $T_{m2}$ | 0 | 0 | 30 | 0 | 0.0258 | 0.0285 | ... | 0.5379 |
|  | ... | ... | ... | ... | ... | ... | ... | ... | ... |
|  | $T_{m2}$ | 100 | 100 | 90 | 0 | 0.0801 | 0.0882 | ... | 0.6761 |
|  | $T_{m2}$ | 100 | 100 | 100 | 100 | 0.0730 | 0.0808 | ... | 0.7622 |

413 — 4131, 4132, 4133

| PRESET MEDIA DATA | | | | | | | | | |
|---|---|---|---|---|---|---|---|---|---|
| MEDIUM 3 | | | | | | | | | |
| MEDIUM 2 | | | | | | | | | |
| MEDIUM 1 | TEMPERATURE | C | M | Y | K | 380[nm] | 390[nm] | ... | 780[nm] |
| MEDIUM WHITE | $T_1$ | 0 | 0 | 0 | 0 | 0.2628 | 0.3127 | ... | 0.7719 |
|  | $T_2$ | 0 | 0 | 0 | 0 | 0.2576 | 0.3086 | ... | 0.7739 |
|  | $T_3$ | 0 | 0 | 0 | 0 | 0.2640 | 0.3145 | ... | 0.7756 |

414 — 4141, 4142, 4143

| TEMPERATURE CHARACTERISTIC LUT | TEMPER-ATURE | C | M | Y | K | ΔR(λ) | | | |
|---|---|---|---|---|---|---|---|---|---|
|  | UNIT TEMPER-ATURE |  |  |  |  | 380[nm] | 390[nm] | ... | 780[nm] |
| PATCH |  | 0 | 0 | 10 | 0 | 0.0004 | 0.0036 | ... | 0.0073 |
|  |  | 0 | 0 | 20 | 0 | 0.0030 | 0.0032 | ... | 0.0051 |
|  |  | 0 | 0 | 30 | 0 | 0.0026 | 0.0029 | ... | 0.0054 |
|  |  | ... | ... | ... | ... | ... | ... | ... | ... |
|  |  | 100 | 100 | 90 | 0 | 0.0080 | 0.0088 | ... | 0.0068 |
|  |  | 100 | 100 | 100 | 100 | 0.0073 | 0.0081 | ... | 0.0076 |

415 — 4151

MEDIA-DEPENDENT IMAGE PROCESSING

TECHNICAL FIELD

The present invention relates to an image processing apparatus and color processing method and, more particularly, to an image processing apparatus and color processing method, which correct image data based on the colorimetric values of patches.

BACKGROUND ART

In general, the colorimetric values of a colored object change depending on temperatures, and this phenomenon is called thermochromism. The thermochromism poses a problem in a situation that requires high-precision colorimetry since it causes errors of colorimetric values according to the temperature of an object to be measured. However, many things are still unknown about the relationship between the thermochromism and colorimetry.

Color stabilization and color matching processing in a general printing apparatus will be described below. Conventionally, in order to control a printing apparatus represented by a printer apparatus to output desired colors, a color conversion lookup table (to be abbreviated as LUT hereinafter) is used. The color conversion LUT includes an LUT used in calibration required to maintain a printing apparatus in a constant state, and an LUT used in color matching represented by ICC profiles. In order to create these color conversion LUTS, for example, a printing apparatus outputs a plurality of color patches such as IT8.7/3 patches. The colors of these plurality of color patches are measured using a colorimeter such as a spectral colorimeter to obtain colorimetric values and to associate device values with device-independent values, thus creating a color conversion LUT. The created LUT absorbs a color appearance difference between devices or that due to variations of a printer engine, thus attaining color matching and color stabilization. Recently, using a color sensor incorporated in a printer, this LUT is generated in real time. In such printer, the built-in color sensor detects patches immediately after fixing, and feeds back their calorimetric values to LUT generation.

However, in a general printer, since the patches immediately after fixing have very high temperatures (about 70° C.), the colorimetric values of the patches change due to the thermochromism. For this reason, an LUT suited to an observation environment (room temperature) of the user cannot be precisely created.

Some media used in general printing contain a fluorescent whitening agent, which absorbs ultraviolet rays and emits fluorescence in the visible range (especially, in a blue-violet range) so as to increase the degree of whiteness. Since the fluorescent whitening effect by the fluorescent whitening agent increases/decreases depending on temperatures, the colorimetric values of printed materials output onto media including the fluorescent whitening agent also change depending on temperatures. Especially, spectral reflectance variations around the blue-violet range (440 nm) in the visible range are large.

Therefore, a technique for correcting calorimetric values in consideration of the temperature at the time of colorimetry in a printer apparatus is demanded, and the following methods are proposed.

In one method, spectral reflectance change amounts for respective wavelengths per unit temperature interval are calculated in advance for respective color samples, and the spectral reflectance at a desired temperature is predicted (for example, see patent reference 1).

In another method, change amounts of absorption coefficients and scattering coefficients in the Kubelka-Munk formula for respective wavelengths per unit temperature interval are calculated for respective color samples, and the spectral reflectance at a desired temperature is predicted (for example, see patent reference 2).

[Patent Reference 1] Japanese Patent No. 3776492
[Patent Reference 2] Japanese Patent No. 3555706

However, in the method which is described in patent reference 1 and calculates spectral reflectance change amounts for respective wavelengths per unit temperature interval, spectral reflectances for all combinations of device values that can be output by a printing apparatus cannot be predicted.

In the method which is described in patent reference 2 and calculates change amounts of absorption coefficients and scattering coefficients for respective wavelengths per unit temperature interval for respective color samples, the spectral reflectance of a mixed color can be predicted according to the mixing ratio of color samples. However, since a printed material that has undergone general halftoning has an uneven colored surface, it is also difficult for this method to predict spectral reflectances for all combinations of device values that can be output by a printing apparatus.

Since neither of the two methods consider the influence of a fluorescent whitening agent contained in substrates of color samples (printing media), they cannot appropriately correct colorimetric values for printed materials using media containing the fluorescent whitening agent.

DISCLOSURE OF INVENTION

The present invention has been made to solve the aforementioned problems, and provides an image processing apparatus and color processing method, which appropriately estimate the colorimetric values of an arbitrary patch at a desired temperature with respect to an arbitrary medium in consideration of the temperature characteristics of the medium.

According to an aspect of the invention, an image processing apparatus of the present invention comprises the following arrangement.

That is, an image processing apparatus comprises: target temperature acquisition means for acquiring a target temperature; and estimation means for estimating target patch colorimetric values obtained when target patches of a plurality of colors formed on a medium using color samples are measured at the target temperature, wherein the estimation means includes: media-dependent variation correction means for correcting, based on temperature characteristics of the medium, patch colorimetric values obtained by measuring the target patches of the plurality of colors formed on the medium using the color samples at a temperature other than the target temperature; and color sample-dependent variation correction means for correcting, based on temperature characteristics of the color samples, the patch calorimetric values corrected by the media-dependent variation correction means to obtain the target patch calorimetric values.

According to another aspect of the invention, an image processing apparatus comprises: target temperature acquisition means for acquiring a target temperature; and estimation means for estimating target patch colorimetric values obtained when target patches of a plurality of colors formed on a medium using color samples are measured at the target temperature, wherein the estimation means includes: color sample-dependent variation correction means for correcting, based on temperature characteristics of the color samples, patch colorimetric values obtained by measuring the target patches of the plurality of colors formed on the medium using the color samples at a temperature other than the target temperature; and media-dependent variation correction means for correcting, based on temperature characteristics of the medium, the patch calorimetric values corrected by the color sample-dependent variation correction means to obtain the target patch calorimetric values.

According to the present invention with the above arrangement, the colorimetric values of an arbitrary patch at a desired temperature with respect to an arbitrary medium can be appropriately estimated in consideration of the temperature characteristics of the medium. Therefore, appropriate image correction can be applied to image data, whose image is to be formed.

Further features of the present invention will become apparent from the following description of exemplary embodiments with reference to the attached drawings.

BRIEF DESCRIPTION OF DRAWINGS

FIGS. 5A and 5B are views showing an example of data held in a storage unit according to this embodiment;

BEST MODE FOR CARRYING OUT THE INVENTION

The present invention will be described in detail hereinafter by way of its preferred embodiments with reference to the accompanying drawings. Note that the arrangements described in the following embodiments are merely examples, and the present invention is not limited to the illustrated arrangements.

First Embodiment

Thermochromism

The thermochromism as a cause of correction of this embodiment will be described first. As described in the related art, many things are unknown about the thermochromism which changes the colorimetric values of a colored object depending on temperatures.

The present inventors investigated the relationship between the temperatures and colorimetric values using patches printed on representative media by a printer apparatus so as to resolve, in detail, the thermochromism, i.e., the temperature dependence of the colorimetric values.

Figure 6:
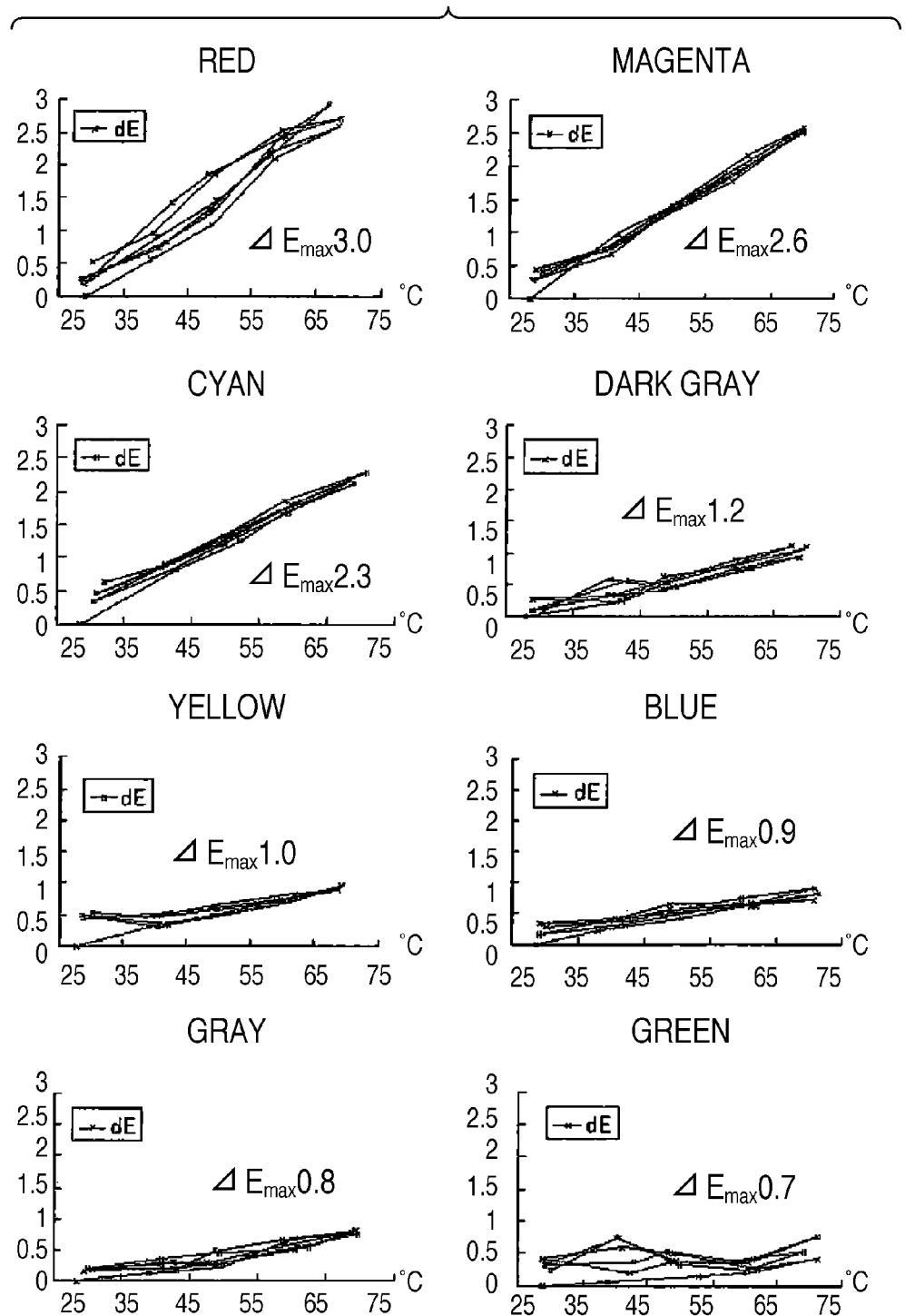
FIG. 6 includes graphs which show the thermochromism phenomena in color differences of representative patches.

FIG. 6 shows representative examples of the verification results obtained by the investigation, and shows the relationships between the colorimetric values and temperatures in association with eight colors, i.e., cyan, magenta, yellow, blue, red, green, gray, and dark gray. At the time of this verification, the temperature of each patch itself was changed in increments of 10° C. and colorimetry was done without changing the temperature of a colorimeter. More specifically, after the patch temperature was raised from 30° C. to 70° C., it was lowered from 70° C. to 30° C., and this operation was repeated three times. From these verification results, when the patch temperature was changed from 30° C. to 70° C., it was confirmed that a maximum color difference $\Delta Emax$ of the colorimetric values changed within the range from 0.7 to 3. Also, it was confirmed that the color differences changed nearly linearly according to a change in temperature and those changes were reversible.

Figure 7:
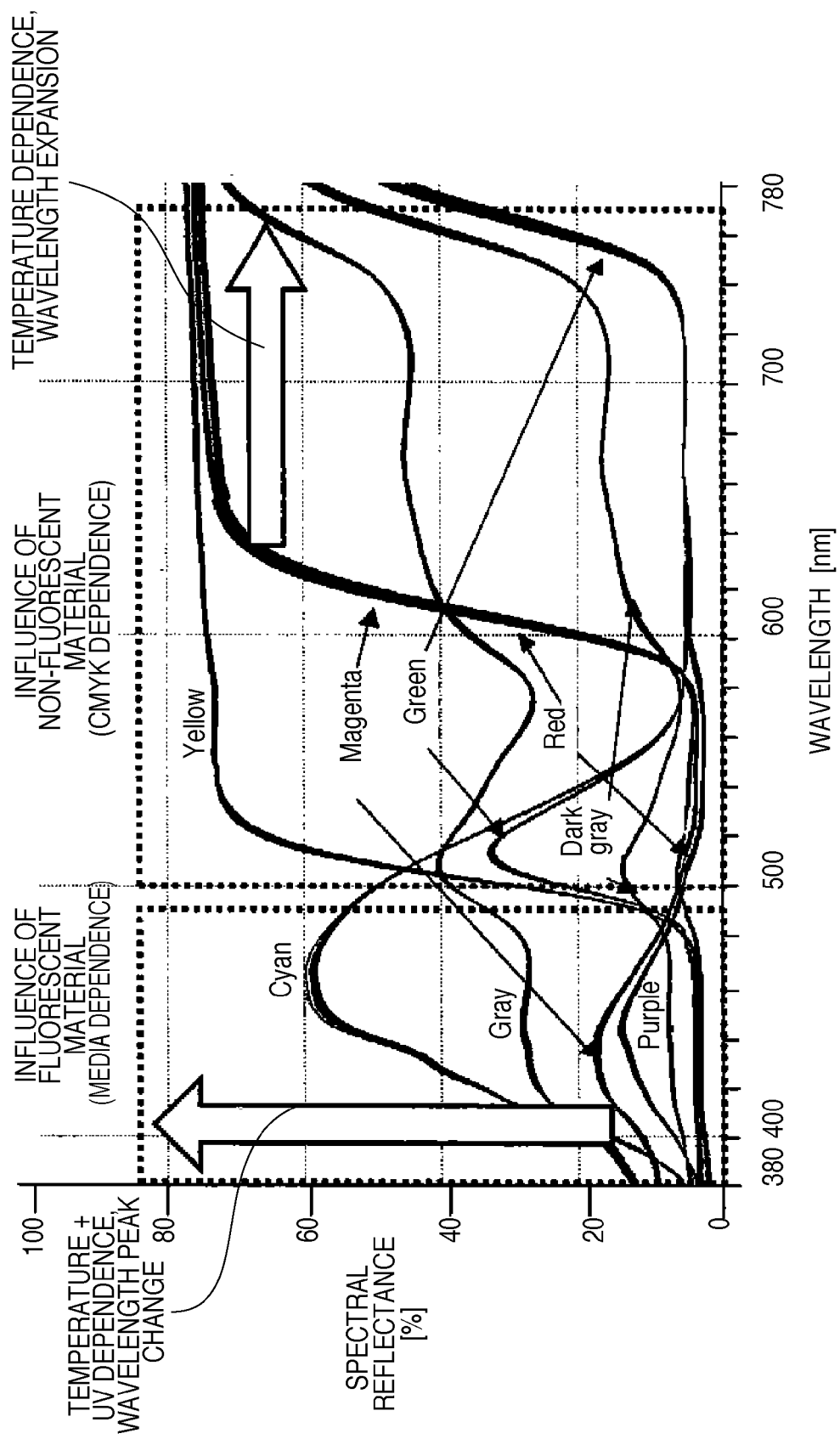
FIG. 7 is a graph showing the thermochromism phenomena in spectral reflectances of representative patches.
Figure 8:
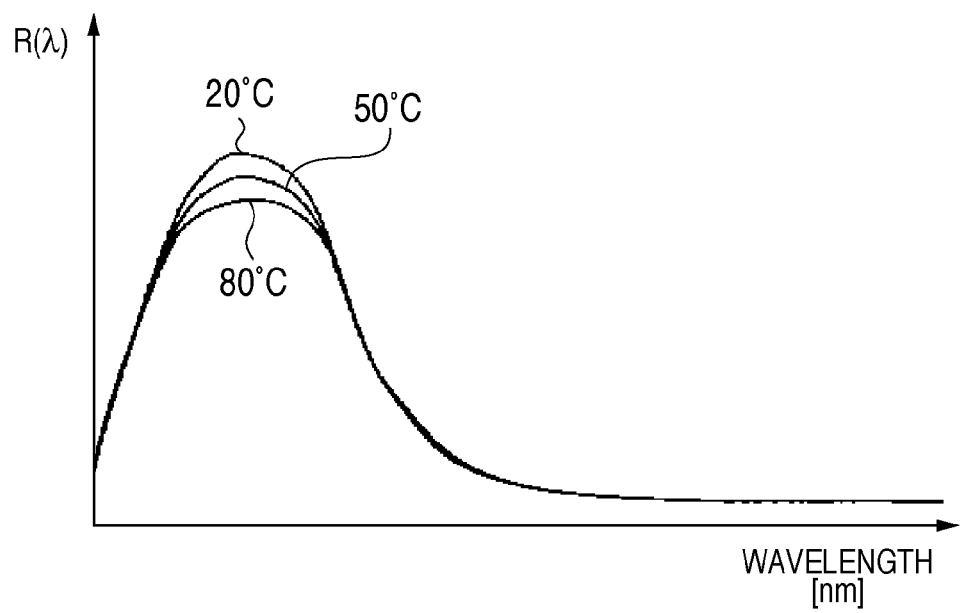
FIG. 8 is a graph showing changes in spectral reflectance due to a change in temperature of a fluorescent material.
Figure 9:
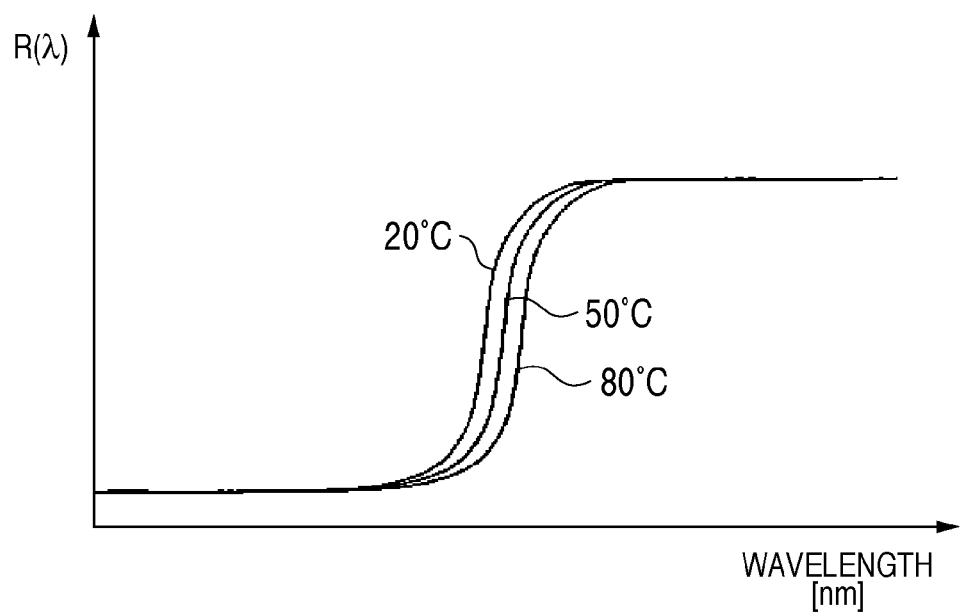
FIG. 9 is a graph showing changes in spectral reflectance due to a change in temperature of a non-fluorescent material.

Furthermore, when this phenomenon was analyzed based on the spectral reflectance, it was found that the phenomenon was classified into variations due to the influence of a fluorescent material such as a fluorescent whitening agent contained in a medium, and those due to the influence of non-fluorescent materials such as color sample (toner) components, as shown in FIG. 7. As can be seen from FIG. 7, the spectral reflectance of a fluorescent material changes longitudinally (wavelength peak change) depending on temperatures, and that of non-fluorescent materials changes laterally (wavelength expansion) depending on temperatures. FIGS. 8 and 9 respectively show the wavelength peak change and wavelength expansion states extracted from FIG. 7.

Since a fluorescent material that exhibits a wavelength peak change, as shown in FIG. 8, is contained in a medium as a fluorescent whitening agent used to increase the degree of whiteness, the colorimetric values of a printed material output onto such medium change depending on temperatures.

This embodiment is characterized in that variations caused by the thermochromism are separated into florescent material-dependent variations and non-fluorescent material-dependent variations, these variations are individually corrected, and the colorimetric values of an arbitrary reproduction color of a printer at a desired temperature are appropriately estimated with respect to an arbitrary medium.

Apparatus Arrangement

This embodiment will explain colorimetric value temperature correction as a color processing method in an electrophotographic printer apparatus which incorporates a color sensor.

Figure 1:
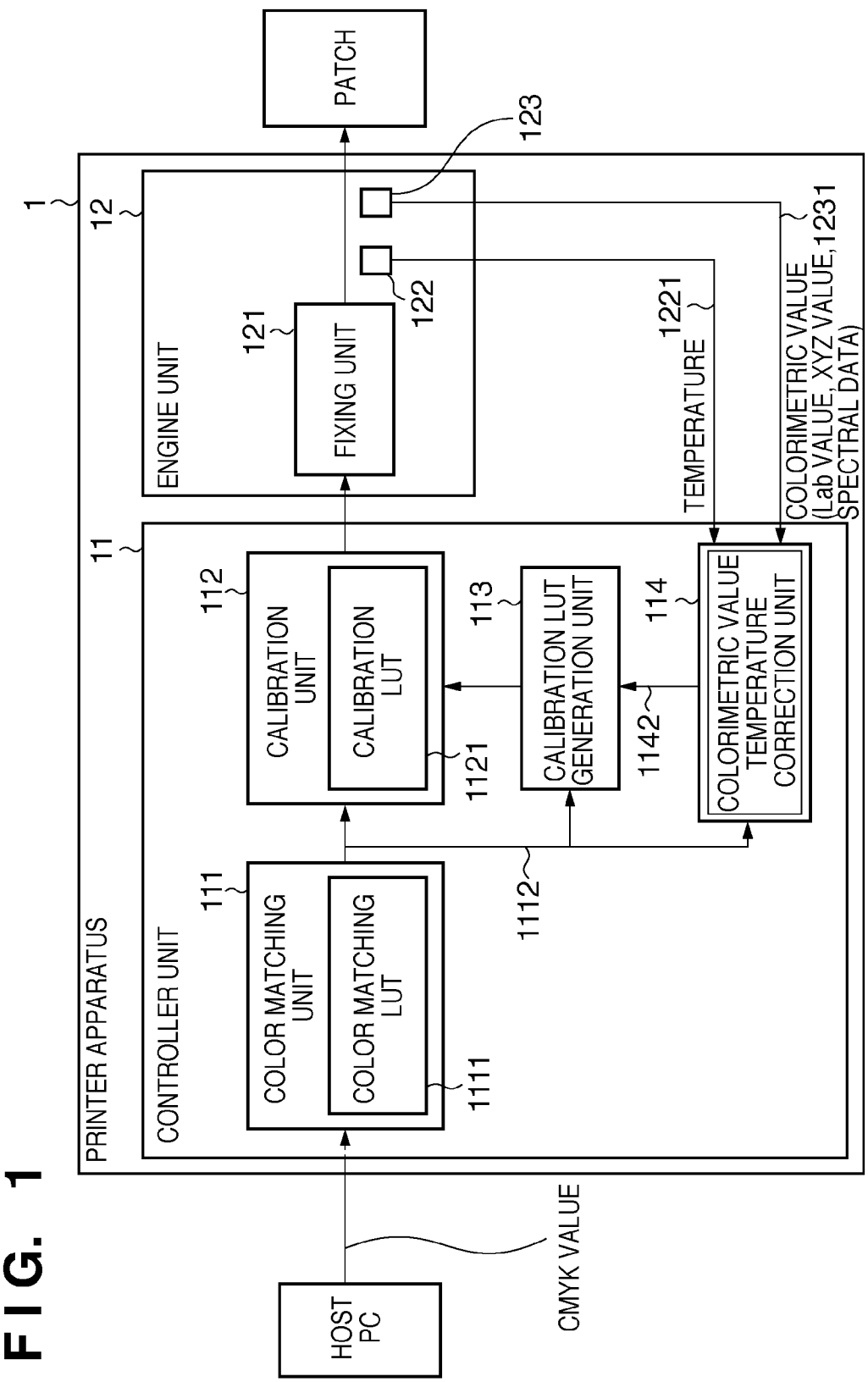
FIG. 1 is a block diagram showing the arrangement of a printer apparatus according to an embodiment of the present invention.

FIG. 1 is a block diagram showing the arrangement of a printer apparatus according to this embodiment. A printer apparatus 1 outputs patches for calibration (target patches) before or during a print job, and measures the colorimetric values of these patches using a built-in colorimetry sensor. Then, the apparatus 1 creates and updates a correction table based on the colorimetric values (target patch colorimetric values), thus maintaining constant color reproducibility of the apparatus. At this time, the output target patches of a plurality of colors for calibration have high temperatures immediately after fixing, and their colorimetric values vary by the thermochromism. Hence, this embodiment is characterized by applying correction to these colorimetric values.

Functional units of the printer apparatus 1 are roughly classified into a controller unit 11 and engine unit 12. The controller unit 11 includes a color matching unit 111, calibration unit 112, calibration LUT generation unit 113, and colorimetric value temperature correction unit 114. Note that the controller unit 11 includes various other functional units associated with image processing, but a description of the units which do not directly relate to this embodiment will not be given.

The color matching unit 111 executes color adjustment using a color matching LUT 1111 represented by an ICC profile. The calibration unit 112 executes image correction (calibration) to maintain a constant print state using a calibration LUT 1121. That is, by multi-dimensionally converting image data (device values) CMYK, whose image is to be formed and which is output from the color matching unit 111, using the calibration LUT 1121, corrected CMYK values are obtained.

The colorimetric value temperature correction unit 114 estimates target patch colorimetric values as patch calorimetric values at a target temperature by correcting temperature variations of the patch colorimetric values.

The calibration LUT generation unit 113 generates the calibration LUT 1121 in the calibration unit 112 using the colorimetric values at the target temperature, which are corrected by the colorimetric value temperature correction unit 114.

On the other hand, the engine unit 12 includes a fixing unit 121, temperature sensor unit 122, and color sensor unit 123. Note that the engine unit 12 includes various other functional units used to form an image on a medium, but a description of the units which do not directly relate to this embodiment will not be given.

The fixing unit 121 includes a combination of rollers and a belt, incorporates a heat source such as a halogen heater, and melts and fixes color samples (toners) attached on a medium by heat and pressure. The temperature sensor unit 122 and color sensor unit 123 are arranged on a convey path from the fixing unit 121 to a discharge port, and respectively measure the temperature and chromaticity value of each patch.

Figure 2:
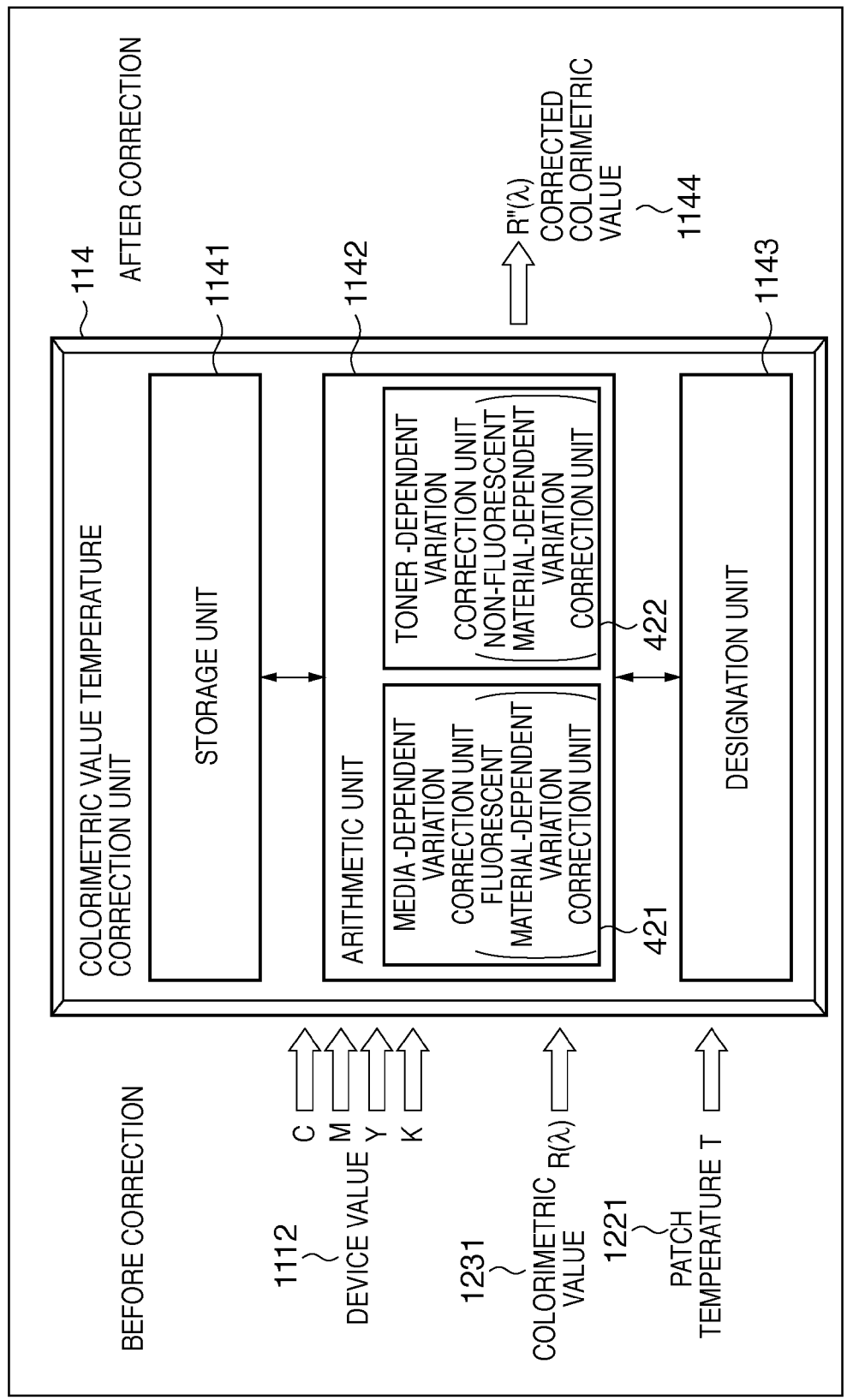
FIG. 2 is a block diagram showing the detailed arrangement of a colorimetric value temperature correction unit according to this embodiment.

The detailed arrangement of the colorimetric value temperature correction unit 114 will be described below. As shown in FIG. 2, the colorimetric value temperature correction unit 114 includes a storage unit 1141, arithmetic unit 1142, and designation unit 1143.

As shown in FIGS. 5A and 5B, the storage unit 1141 stores media-dependent variation-corrected data 411, toner-dependent variation-corrected data 412, measured data 413, preset media data 414, and a temperature characteristic LUT for toner-dependent variation correction (to be simply referred to as a temperature characteristic LUT hereinafter) 415. Each of these five types of data includes a temperature, CMYK values, and spectral reflectance values (or spectral reflectance change amounts).

The media-dependent variation-corrected data 411 includes media-dependent variation-corrected colorimetric values at a target temperature, which are generated by a media-dependent variation correction unit 421 in the arithmetic unit 1142. The toner-dependent variation-corrected data 412 includes toner-dependent variation, i.e., color sample-dependent variation-corrected colorimetric values at a target temperature, which are generated by a toner-dependent variation correction unit 422 in the arithmetic unit 1142. The measured data 413 includes colorimetric values acquired by the temperature sensor unit 122 and color sensor unit 123. The preset media data 414 includes medium white colorimetric values of various media measured at a plurality of temperatures in advance. The temperature characteristic LUT 415 includes spectral reflectance change amounts per unit temperature interval of reference patches, which are created in advance, as will be described later.

As shown in FIG. 2, the arithmetic unit 1142 includes the media-dependent variation correction unit 421 and toner-dependent variation correction unit 422. The media-dependent variation correction unit 421 is first estimation means which estimates fluorescent material (fluorescent whitening agent)-dependent colorimetric value variations. The media-dependent variation correction unit 421 corrects media-dependent variations in colorimetric values 1231, and stores the corrected colorimetric values as the media dependent variation-corrected data 411 in the storage unit 1141. The toner-dependent variation correction unit 422 is second estimation means which estimates non-fluorescent material (toner) dependent colorimetric value variations. The toner-dependent variation correction unit 422 corrects toner-dependent variations in the media-dependent variation-corrected data 411, and stores the corrected data as the toner-dependent variation-corrected data 412 in the storage unit 1141.

Figure 3:
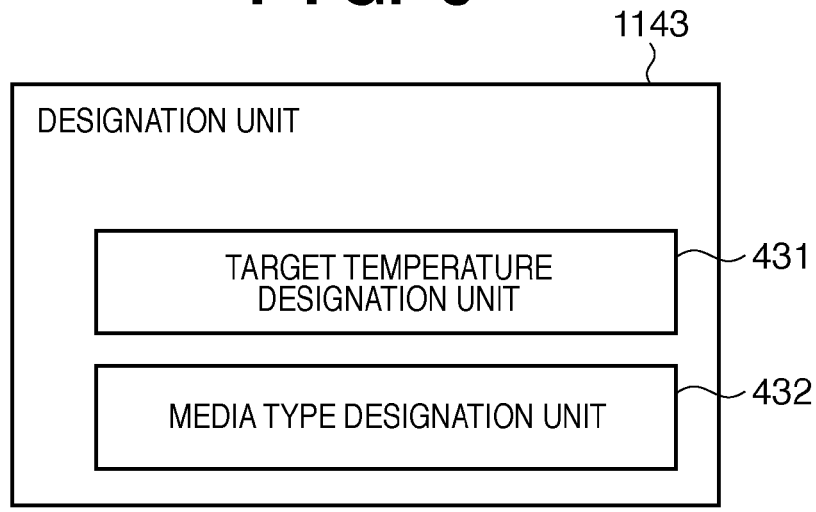
FIG. 3 is a block diagram showing the detailed arrangement of a designation unit according to this embodiment.
Figure 4:
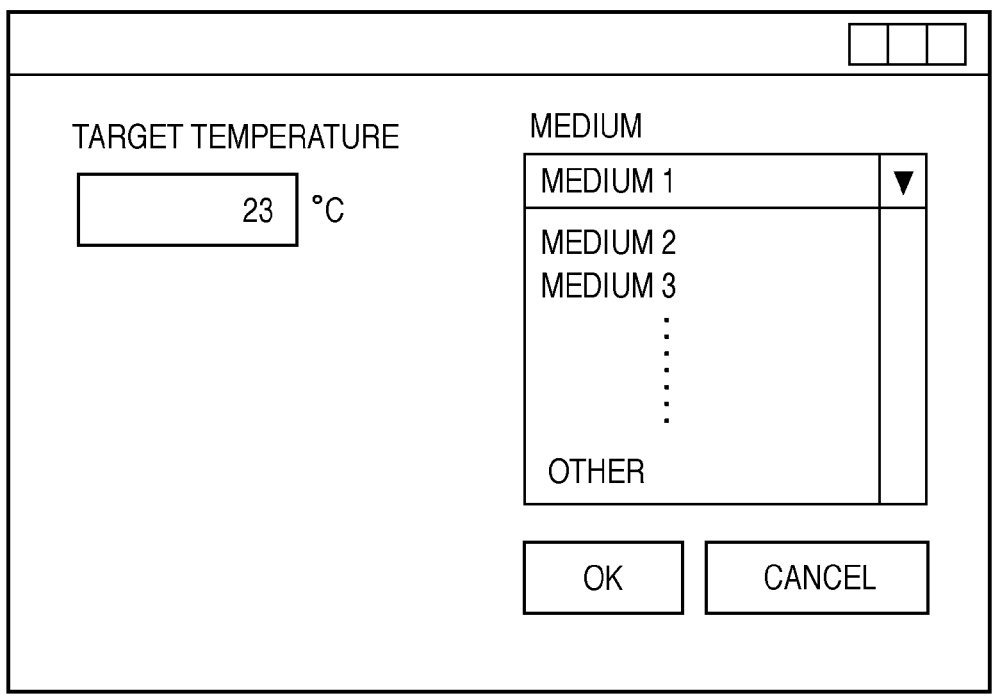
FIG. 4 is a view showing an example of a UI which implements the designation unit according to this embodiment.

As shown in FIG. 3, the designation unit 1143 includes a target temperature designation unit 431 and media type designation unit 432. The target temperature designation unit 431 designates a desired target temperature based on a user instruction. As an example of the target temperature, 23° C. as the standard temperature in the colorimetry field (JIS Z8703) are used. The media type designation unit 432 designates a media type used upon outputting patches of a plurality of colors for calibration. The designation unit 1143 is implemented by, for example, displaying a user interface (UI) shown in FIG. 4 on a PC or a front panel of a printer, so as to allow to designate the target temperature and media type according to user instructions.

Calibration LUT Creation Processing

In this embodiment, upon generation of the calibration LUT 1121, the calorimetric value temperature correction unit 114 corrects the colorimetric values of patches measured by the color sensor unit 123. Colorimetric value temperature correction processing according to this embodiment is characterized in that colorimetric value variations caused by the thermochromism are separated into fluorescent material (a fluorescent whitening agent contained in a medium) dependent variations, and non-fluorescent material (toner) dependent variations, and these variations are independently corrected. That is, the colorimetric value temperature correction unit 114 executes media-dependent variation correction processing using the media-dependent variation correction unit 421 for actual colorimetric values first, and then executes toner-dependent variation correction processing using the toner-dependent variation correction unit 422, thereby estimating target patch colorimetric values as colorimetric values at a target temperature.

Figure 12:
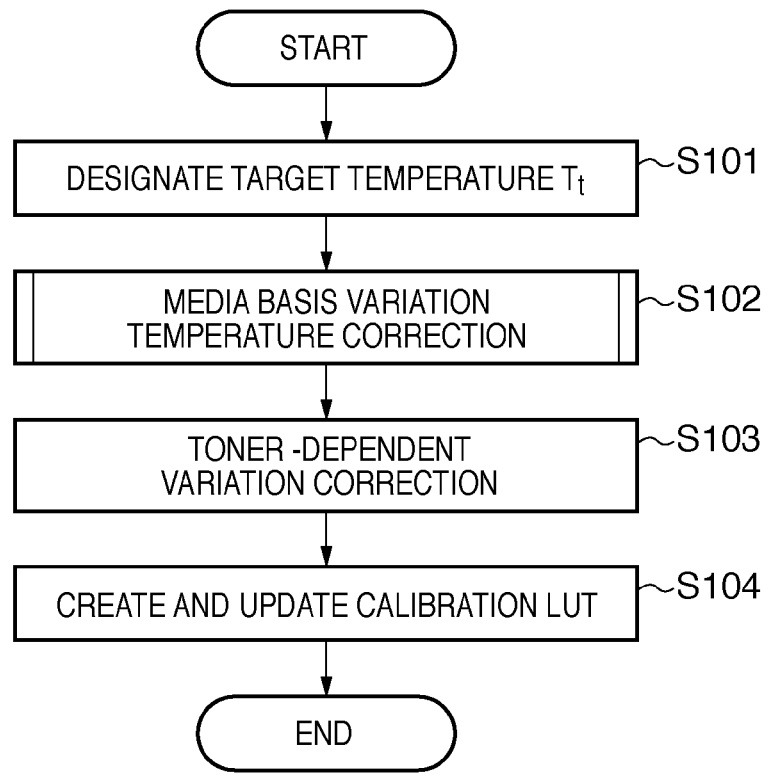
FIG. 12 is a flowchart showing calibration LUT creation processing according to this embodiment.

An overview of the generation processing of the calibration LUT 1121 in the printer apparatus 1 of this embodiment will be described below with reference to the flowchart of FIG. 12.

In step S101, the user designates a target temperature $T_t$ using the target temperature designation unit 431.

In step S102, the media-dependent variation correction processing for correcting the influence of a fluorescent whitening agent contained in a medium is applied to patch colorimetric values at a temperature other than the target temperature, which are measured by the color sensor unit 123. Details of this processing will be described later.

In step S103, the toner-dependent variation correction processing for correcting the influence of non-fluorescent materials (toners) is further applied to the corrected patch colorimetric values. Details of this processing will be described later.

The processes in steps S102 and S103 can respectively correct a thermochromism phenomenon caused by a fluorescent material (fluorescent whitening agent) contained in a medium and that caused by toners, i.e., non-fluorescent materials in the patch colorimetric values at a temperature other than the target temperature. Corrected colorimetric values 1144 obtained as a result of these correction processes are target calorimetric values at the target temperature.

In step S104, the calibration LUT generation unit 113 generates a new calibration LUT 1121 based on the corrected colorimetric values 1144, thus updating the calibration unit 112.

Media-Dependent Variation Correction Processing

Figure 10:
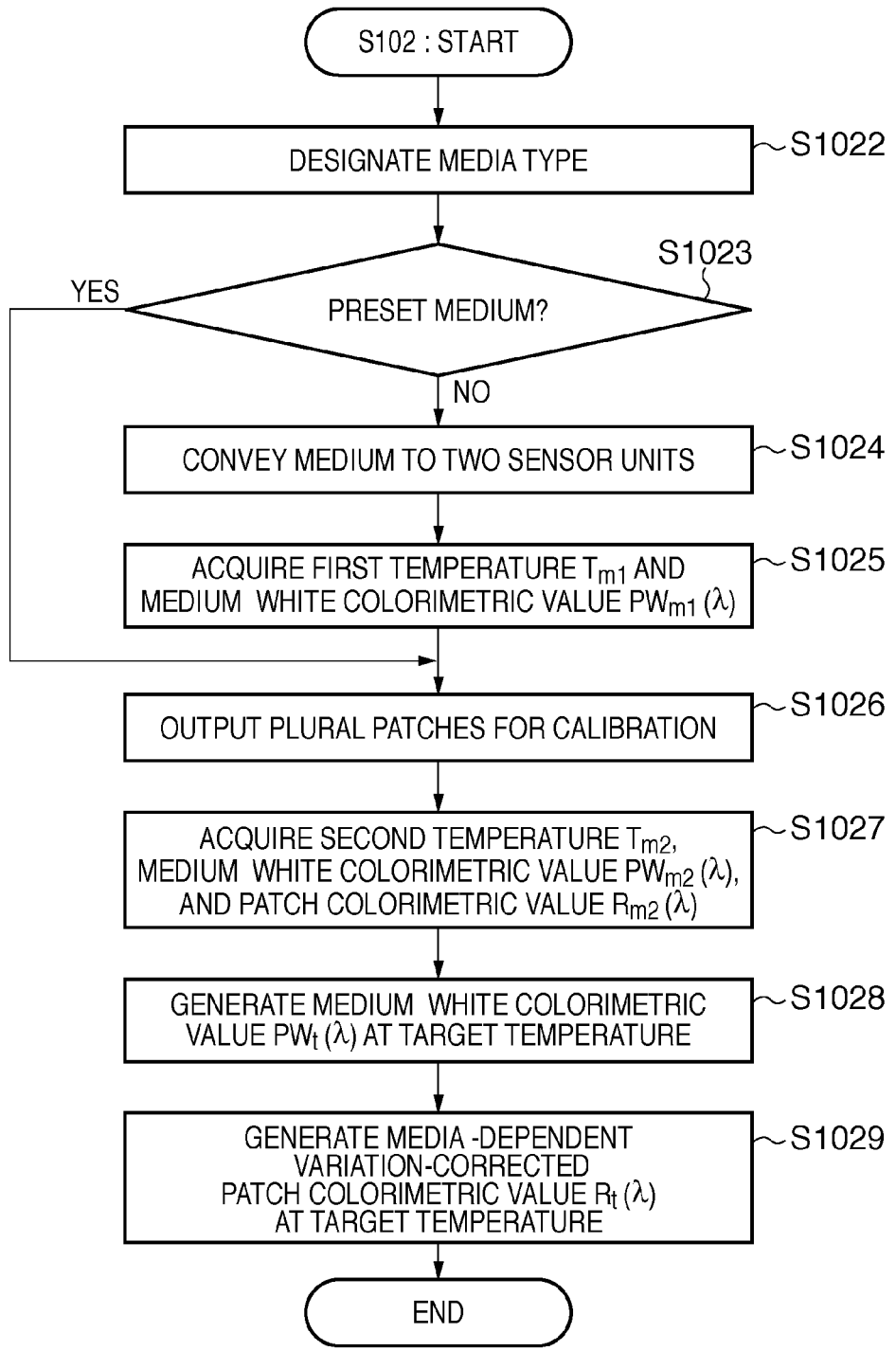
FIG. 10 is a flowchart showing media-dependent variation correction processing according to this embodiment.

The media-dependent variation correction processing in step S102 will be described in detail below with reference to the flowchart of FIG. 10.

In the media-dependent variation correction processing of this embodiment, assume that colorimetry of a medium and patches formed on the medium is done under a light source including the ultraviolet range (UV). That is, various colorimetric values obtained in the media-dependent variation correction processing include the influence of the fluorescent whitening agent.

In step S1022, the user designates a medium used in calibration using the media type designation unit 432. The control conditionally branches by checking in step S1023 whether or not the medium designated in step S1022 is a preset medium, i.e., whether or not the designated medium is that stored as the preset media data 414 in the storage unit 1141. That is, if the designated medium is a preset medium, the process jumps to step S1026; otherwise, the process advances to step S1024.

In step S1024, the designated medium set on the printer apparatus 1 is conveyed to a position (measurement position) where the measurements by the temperature sensor unit 122 and color sensor unit 123 are allowed. In step S1025, the temperature sensor unit 122 measures a first temperature $T_{m1}$ as the medium temperature, and the color sensor unit 123 acquires medium white calorimetric values $PW_{m1}(\lambda)$ on the medium. The acquired first temperature and medium white calorimetric values at the first temperature are stored as first medium colorimetric values 4131 in the measured data 413 in the storage unit 1141. This first temperature $T_{m1}$ is not high (it is low) since it is not influenced by heat of the fixing unit 121.

In step S1026, patch data of a plurality of colors for calibration are formed on the medium based on, for example, data output from a PC, and that medium is conveyed to the measurement position of the sensors. At this time, the patches on the medium are formed by developing and fixing toners, as a matter of course.

In step S1027, the temperature sensor unit 122 measures a second temperature $T_{m2}$ as a temperature immediately after patch formation. Also, the color sensor unit 123 acquires medium white colorimetric values $PW_{m2}(\lambda)$ and patch colorimetric values $R_{m2}(\lambda)$ on the medium immediately after the patch formation. In case of a preset medium, the second temperature and medium white colorimetric values need not be measured in this step. The second temperature $T_{m2}$ and medium white colorimetric values $PW_{m2}(\lambda)$ at the second temperature acquired in this step are stored as second medium colorimetric values 4132 in the measured data 413 in the storage unit 1141. Likewise, the patch colorimetric values $R_{m2}(\lambda)$ are stored as reference patch colorimetric values 4133. This second temperature $T_{m2}$ is high since it is influenced by heat of the fixing unit 121.

In step S1028, the media-dependent variation correction unit 421 generates third medium colorimetric values $PW_t(\lambda)$ as medium white colorimetric values at the target temperature $T_t$. Then, the media-dependent variation correction unit 421 stores the third medium colorimetric values $PW_t(\lambda)$ as medium colorimetric values 4111 in the media-dependent variation-corrected data 411 in the storage unit 1141. The third medium colorimetric values $PW_t(\lambda)$ are estimate colorimetric values which will be obtained when the designated medium is measured at the target temperature. This estimation arithmetic operation is made under the assumption that medium white calorimetric values linearly change as the temperature changes. More specifically, the following formulas are used depending on whether or not the designated medium is a preset medium.

When the designated medium is a preset medium, formula (1) below is used:

$$PW_t(\lambda) = PW_1(\lambda) + (PW_2(\lambda) - PW_1(\lambda)) \times \frac{T_t - T_1}{T_2 - T_1} \quad (1)$$

As parameters in formula (1), first and second medium colorimetric values 4141 and 4142, which are held as the preset media data 414 in the storage unit 1141, are used. More specifically, a first temperature $T_1$, second temperature $T_2$, medium white spectral reflectances $PW_1(\lambda)$ at the first temperature, and medium white spectral reflectances $PW_2(\lambda)$ at the second temperature are used.

On the other hand, when the designated medium is not a preset medium, formula (2) below is used:

$$PW_t(\lambda) = PW_{m1}(\lambda) + (PW_{m2}(\lambda) - PW_{m1}(\lambda)) \times \frac{T_t - T_{m1}}{T_{m2} - T_{m1}} \quad (2)$$

As parameters in formula (2), the first and second medium calorimetric values 4131 and 4132 (measured values in steps S1025 and S1027), which are held as the measured data 413 in the storage unit 1141, are used. That is, the first temperature $T_{m1}$ and medium white spectral reflectances $PW_{m1}(\lambda)$ at the first temperature as the first medium colorimetric values 4131 are used. Also, the second temperature $T_{m2}$ and medium white spectral reflectances $PW_{m2}(\lambda)$ at the second temperature as the second medium colorimetric values 4132 are used.

Even when the designated medium is a preset medium, the colorimetric values in step S1027 may be applied as the second temperature and second medium calorimetric values at that temperature. In this case, a calculation formula of the third medium calorimetric values at the target temperature is obtained by modifying formula (1) above. That is, $T_2$ and $PW_2(\lambda)$ in formula (1) are respectively replaced by $T_{m2}$ and $PW_{m2}(\lambda)$.

In step S1029, the media-dependent variation correction unit 421 generates patch calorimetric values $R_t(\lambda)$ at the target temperature using the third medium calorimetric values $PW_t(\lambda)$ calculated, as described above. The patch calorimetric values $R_t(\lambda)$ generated in this step are sequentially stored as patch calorimetric values 4112 in the media-dependent variation-corrected data 411 in the storage unit 1141. The patch calorimetric values $R_t(\lambda)$ are estimate colorimetric values which will be obtained when the plurality of colors of patches formed on the designated medium using toners are measured at the target temperature. As this estimation arithmetic operation, for example, formula (3) below is used.

$$R_t(\lambda) = R_{m2}(\lambda) \times \frac{PW_t(\lambda)}{PW_{m2}(\lambda)} \quad (3)$$

As parameters in formula (3), the second medium colorimetric values 4132 and reference patch colorimetric values 4133 (measured values in step S1027), which are held as the measured data 413 in the storage unit 1141, are used. That is, medium white spectral reflectances $PW_{m2}(\lambda)$ and patch spectral reflectances $R_{m2}(\lambda)$ at the second temperature are used.

With the aforementioned media-dependent variation correction processing, variations caused by a fluorescent material contained in a medium can be corrected from the patch colorimetric values.

Toner-Dependent Variation Correction Processing

The toner-dependent variation correction processing in step S103 will be described in detail below.

In general, a fluorescent whitening agent absorbs the ultraviolet range (UV) in light and emits visible light rays around 440 nm. For this reason, when the colorimetric values of patches are measured under a so-called UV-cut light source which does not include any ultraviolet range, the influence of the fluorescent whitening agent due to a temperature change, i.e., media-dependent variations, can be removed. Hence, in the toner-dependent variation correction processing of this embodiment, assume that the temperature characteristic LUT which holds the temperature characteristics for toner-dependent variation correction under the UV-cut light source is to be referred to. Therefore, this temperature characteristic LUT has to be created in advance.

Figure 11:
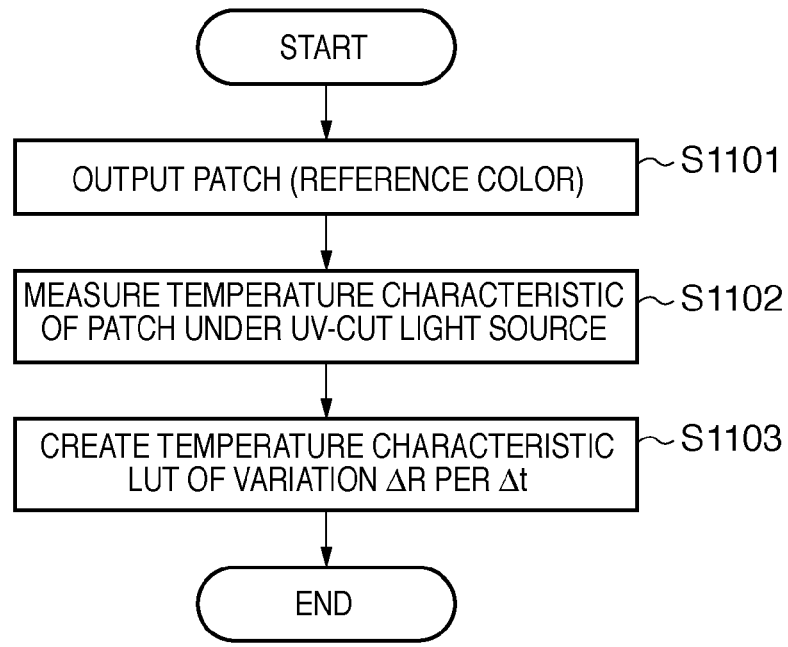
FIG. 11 is a flowchart showing creation processing of a temperature characteristic LUT for toner-dependent variation correction according to this embodiment.

FIG. 11 is a flowchart showing the creation processing of this temperature characteristic LUT.

In step S1101, an arbitrary medium is prepared, and patches of reference colors are formed and printed on the medium using an arbitrary printer (the printer apparatus 1 is also used). Note that color samples used in this arbitrary printer are the same as toners used in the printer apparatus 1. Patches to be formed are those of N steps for C, M, Y, and K, respectively. For example, in case of three steps per color, reference color patches of a total of $3^4=81$ colors are printed.

In step S1102, the temperature of the printed reference patches is changed, and changes in colorimetric value at respective temperatures are examined using a colorimeter under the UV-cut light source. More specifically, as changes in colorimetric value, spectral reflectance variation amounts $\Delta R$ per unit temperature interval $\Delta t$ are obtained for each color. The obtained values represent the temperature characteristics of each reference color. Note that the colorimeter used in this step need not always be the same device as the color sensor unit 123, but it preferably has colorimetry characteristics similar to those of the color sensor unit 123.

In step S1103, an LUT is created based on the obtained spectral reflectance variation amounts (temperature characteristics) per unit temperature interval, and is stored as the temperature characteristic LUT 415 in the storage unit 1141.

The temperature characteristic LUT 415 exhibits temperature characteristics in which the influence of the fluorescent whitening agent contained in the medium is eliminated since it is created, as described above. Note that this embodiment assumes that a change in spectral reflectance R due to a temperature change is almost linear, as shown in FIG. 6.

The toner-dependent variation correction processing is executed using the temperature characteristic LUT 415 created as described above.

More specifically, the toner-dependent variation correction unit 422 applies toner-dependent variation correction to the media-dependent variation-corrected patch colorimetric values 4112 stored in the media-dependent variation-corrected data 411 in the storage unit 1141. That is, the toner-dependent variation correction unit 422 further corrects the media-dependent variation-corrected spectral reflectances $R_t(\lambda)$.

The toner-dependent variation correction processing uses the second temperature $T_{m2}$ as the temperature of the patches output at the time of the aforementioned media-dependent variation correction processing.

As shown in FIG. 2, the toner-dependent variation correction unit 422 calculates a spectral reflectance change amount $\Delta R'$ per unit temperature interval $\Delta t$ using the already created temperature characteristic LUT 415. This calculation is implemented by an interpolation arithmetic operation based on device values CMYK 1112 of the patches and the second temperature $T_{m2}$ as a patch temperature 1221. As this interpolation arithmetic operation, CMYK four-dimensional linear interpolation is used. Then, the toner-dependent variation correction unit 422 generates spectral reflectances $R'_t(\lambda)$ at the target temperature $T_t$ as the corrected colorimetric values 1144 based on the calculated spectral reflectance variation amount $\Delta R'$ per unit temperature interval $\Delta t$. This generation is executed using the second temperature $T_{m2}$ as the patch temperature 1221 and the spectral reflectances $R_t(\lambda)$ as the media-dependent variation-corrected patch colorimetric values $R(\lambda)$ 1231 based on:

$$R''_t(\lambda) = R_t(\lambda) + (T_t - T_{m2})\Delta R'_t(\lambda) \quad (4)$$

The generated spectral reflectances $R''_t(\lambda)$ for a plurality of colors are sequentially stored as the patch colorimetric values 4122 in the toner-dependent variation-corrected data 412 in the storage unit 1141.

With the aforementioned toner-dependent variation correction processing, variations caused by toners as color samples, i.e., non-fluorescent materials can be further corrected in the patch colorimetric values in which variations caused by the fluorescent material contained in the medium have already been corrected, thus obtaining final target patch colorimetric values.

In the example of this embodiment, the toner-dependent variation correction processing is executed after the media-dependent variation correction processing. However, their operation order may be reversed as long as both of these processes are executed. When the operation order is reversed, the temperature and colorimetric values of patches immediately after fixing are measured in the toner-dependent variation correction processing, and the media-dependent variation correction processing diverts these measurement results.

As described above, according to this embodiment, patch colorimetric values which will be obtained upon measuring the colorimetric values of patches formed on a medium at a desired target temperature are estimated based on the temperature characteristics of the medium and color samples (toners). At this time, thermochromism phenomena caused by a fluorescent material (fluorescent whitening agent of the medium) and non-fluorescent materials (toner components) are individually corrected. Then, since the colorimetric values of an arbitrary reproduction color of a printer at a desired temperature can be appropriately estimated in consideration of the temperature characteristics of an arbitrary medium, a calibration LUT which does not depend on the temperature of patches immediately after fixing can be generated. Therefore, reproduction colors in the printer apparatus can be stabilized.

In this embodiment, the colorimetric values of patches used to create a calibration LUT are corrected. Also, the colorimetric values of patches used to create a color profile LUT can be corrected in the same sequence.

Note that this embodiment has exemplified the colorimetric value correction in the electrophotographic printer apparatus 1. Also, the present invention is applicable to printing apparatuses of other systems, as a matter of course.

In the example of this embodiment, both the media-dependent variation correction unit 421 and toner-dependent variation correction unit 422 correct the spectral reflectances of the colorimetric values. In place of the spectral reflectances, CIE L*a*b* values indicating chromaticity may be corrected. In this case, since no data conversion is required to generate a calibration LUT, the arrangement can be simpler than correction using the spectral reflectances.

Second Embodiment

The second embodiment according to the present invention will be described below. Since the arrangement of a printer apparatus according to the second embodiment is the same as that of the first embodiment, the same reference numerals denote the same components, and a description thereof will not be repeated.

The first embodiment has exemplified that the toner-dependent variation correction unit 422 corrects the calorimetric values using the temperature characteristic LUT created based on the reference patches. As is known, temperature-dependent spectral reflectance variations caused by non-fluorescent materials represented by CMYK toners shift toward the long wavelength side in rising locus parts of spectral reflectance curves on the long wavelength side (e.g., 600 nm or more) of the visible light range, as shown in FIG. 9. Hence, the second embodiment is characterized in that the toner-dependent variation correction unit 422 corrects colorimetric values using an approximation formula that represents wavelength expansion.

For example, let $R_{nonuvt}(\lambda)$ be patch spectral reflectances under a UV-cut light source at a target temperature t, and $\Delta\lambda$ be a wavelength expansion amount per temperature change $\Delta t$ at $\lambda \geq 600$ nm. Then, the patch spectral reflectances can be corrected using:

When $\lambda < 600$ nm, $$R_{nonuvt+\Delta t}(\lambda) \cong R_{nonuvt}(\lambda) \quad (5)$$

When $\lambda \geq 600$ nm, $$R_{nonuvt+\Delta t}(\lambda) \cong R_{nonuvt}(\lambda - \Delta\lambda) \quad (6)$$

Figure 13:
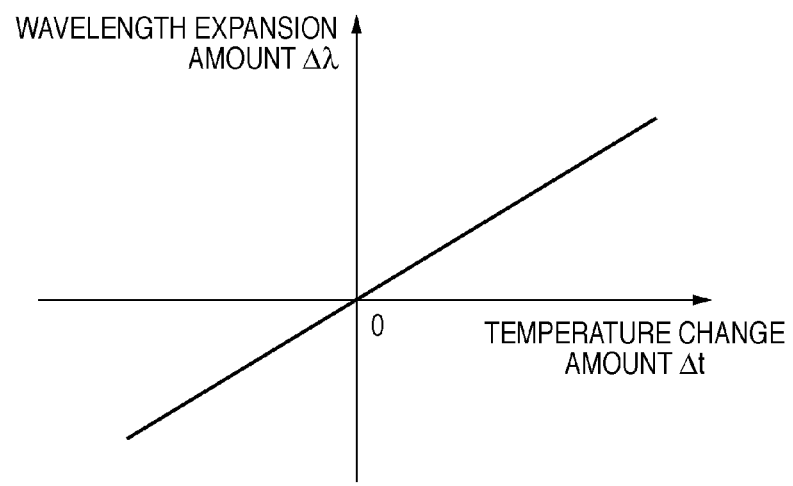
FIG. 13 is a graph showing an example of the relationship between a temperature change amount and spectral reflectance change amount according to the second embodiment.

In formula (6) above, the wavelength expansion amount $\Delta\lambda$ is expressed by $\Delta\lambda = f(\Delta t)$, and is, for example, a wavelength expansion amount per temperature change $\Delta t$ 600 nm or more. FIG. 13 exemplifies the relationship between $\Delta\lambda$ and $\Delta t$. As shown in FIG. 13, the wavelength expansion amount $\Delta\lambda$ linearly expands according to the temperature change amount $\Delta t$.

As described above, the toner-dependent variation correction unit 422 of the second embodiment corrects a change in spectral reflectance due to a temperature change using the approximation formula that expresses a wavelength change with respect to the long wavelength side of the visible light range.

Note that the spectral reflectances dominantly shift toward the long wavelength side in the rising locus parts of the spectral reflectance curves, as shown in FIG. 9. In practice, in spectral reflectance curves of mixed colors based on arbitrary CMYK values, there are few steep declining locus parts on, e.g., the long wavelength side more than 600 nm based on every CMYK mixed color. In general, a hue having a large thermochromism effect has a relatively large spectral reflectance at a wavelength of 600 nm or more, and has a rising locus part of a spectral reflectance curve. Such hue is obtained for magenta- to red-based colors, and the aforementioned approximation formula can obtain sufficiently high correction precision. Since other colors have small spectral reflectances at, e.g., 600 nm or more, they also have a small thermochromism effect, and actually generated color differences are small. Hence, the aforementioned approximation formula is easily applicable to correction of every color.

In the example of the aforementioned first embodiment, the media-dependent variation correction unit 421 corrects the patch spectral reflectances by measuring the medium spectral reflectances at the first and second temperatures. As is known, in general, in spectral reflectance variations due to a temperature change caused by a fluorescent material (fluorescent whitening agent or the like) contained in a medium, the spectral reflectances increase/decrease to have wavelengths around 440 nm as the short wavelength side of the visible light range as the center, as shown in FIG. 8. Hence, the second embodiment is characterized in that the media-dependent variation correction unit 421 corrects colorimetric values using an approximation formula that represents a wavelength peak change.

For example, let $R_{uvont}(\lambda)$ be patch spectral reflectances under a light source including UV at a target temperature t, and $g(\lambda, \Delta t)$ be a spectral reflectance change amount per temperature change $\Delta t$. Then, the patch spectral reflectances can be corrected using:

$$R_{uvont+\Delta t}(\lambda) \cong R_{uvont}(\lambda) \times (1 + g(\lambda, \Delta t)) \quad (7)$$

In formula (7), $g(\lambda, \Delta t)$ is expressed using a spectral reflectance change amount $G(\lambda)$ per unit temperature change amount $\Delta T$ by:

$$g(\lambda, \Delta t) = G(\lambda) \times \frac{\Delta t}{\Delta T} \quad (8)$$

Figure 14:
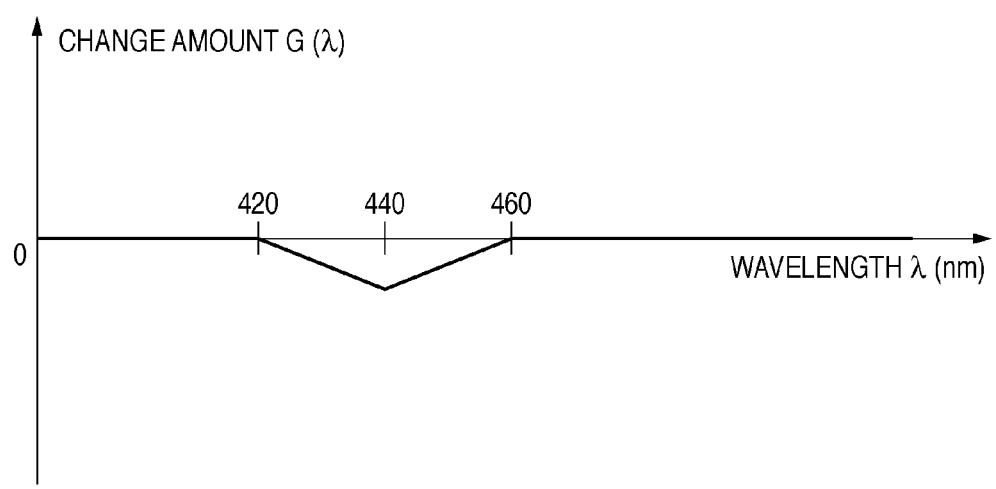
FIG. 14 is a graph showing an example of the relationship between a wavelength and spectral reflectance change amount per unit temperature change amount according to the second embodiment.

FIG. 14 exemplifies the spectral reflectance change amount $G(\lambda)$ per unit temperature change amount $\Delta T$ of a fluorescent material which has an excitation wavelength within the range from 420 to 460 nm, and a maximal point around 440 nm.

In this way, the media-dependent variation correction unit 421 of the second embodiment corrects a spectral reflectance change due to a temperature change using the relation approximation formula that expresses a wavelength peak change with respect to the short wavelength side of the visible light range.

The second embodiment corrects the spectral reflectances per temperature change $\Delta t$ the target temperature t by combining relation approximation formulas (5) and (6) for toner-dependent variations and relation approximation formulas (7) and (8) for media-dependent variations described above. That is, spectral reflectances Rt+Δt(λ) per temperature change Δt the target temperature t are corrected according to:

$$R_t + \Delta t(\lambda) = R_{nonuvt} + \Delta t(\lambda) \times \frac{R_{uvont} + \Delta t(\lambda)}{R_{uvont}(\lambda)} \quad (9)$$

or $$R_t + \Delta t(\lambda) = \frac{R_{nonuvt} + \Delta t(\lambda)}{R_{nonuvt}(\lambda)} \times R_{uvont} + \Delta t(\lambda) \quad (10)$$

As described above, according to the second embodiment, the patch colorimetric values which will be obtained when the colorimetric values of patches formed on a medium are measured at a desired target temperature are estimated based on the approximation formulas that consider the medium and the temperature characteristics of toners. These approximation formulas can appropriately estimate the patch colorimetric values since they individually consider a thermochromism phenomenon caused by a fluorescent material (fluorescent whitening agent of the medium) and that caused by non-fluorescent materials (toner components), as in the first embodiment.

The approximation formulas exemplified in the second embodiment are merely simple examples. When correction with higher precision is required, more complicated approximation formulas which approximate spectral reflectance variations due to a temperature change caused by a fluorescent material or non-fluorescent materials with higher precision may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-257788, filed Oct. 2, 2008, which is hereby incorporated by reference in its entirety.

The invention claimed is:

1. An image processing apparatus comprising:
a target temperature acquisition unit, configured to acquire a target temperature; and
an estimation unit, configured to estimate a target patch colorimetric value that is obtained when a target patch of a color formed on a medium using color material is measured at the target temperature,
wherein the estimation unit includes:
a media-dependent variation correction unit, configured to correct, based on a temperature characteristic of the medium, a patch colorimetric value obtained by measuring a target patch of the color formed on the medium using color material at a temperature; and
a color material dependent variation correction unit, configured to correct, based on a temperature characteristic of the color material, the patch colorimetric value corrected by the media-dependent variation correction unit to obtain the target patch colorimetric value at the target temperatures.

2. An image processing apparatus comprising:
a target temperature acquisition unit, configured to acquire a target temperature; and
an estimation unit, configured to estimate a target patch colorimetric value that is obtained when a target patch of a color formed on a medium using color material is measured at the target temperature,
wherein the estimation unit includes:
a color material-dependent variation correction unit, configured to correct, based on a temperature characteristic of the color material, a patch colorimetric value obtained by measuring the target patch of the color formed on the medium using the color material at a temperature; and
a media-dependent variation correction unit, configured to correct, based on a temperature characteristic of the medium, the patch colorimetric value corrected by the color material-dependent variation correction unit to obtain the target patch colorimetric value at the target temperature.

3. The apparatus according to claim 1, wherein the media-dependent variation correction unit corrects the patch colorimetric value based on colorimetric value obtained by measuring the medium under a light source which includes an ultraviolet range, and
the color material-dependent variation correction unit corrects the patch colorimetric value based on colorimetric value obtained by measuring reference patch of a color using the color material under a light source which does not include any ultraviolet range.

4. The apparatus according to claim 3, wherein the color material-dependent variation correction unit corrects the colorimetric value by referring to a table based on data of the target patch of the color, and
the table has information of colorimetric values obtained by measuring the reference patch of color using the color material at a plurality of temperatures under the light source which does not include any ultraviolet range.

5. The apparatus according to claim 4, wherein the table has information of colorimetric value change amounts per unit temperature interval in association with the reference patch of color, and
the color material-dependent variation correction unit calculates colorimetric value change amounts per unit temperature interval of the data of the reference patch of color using an interpolation arithmetic operation based on the table, and corrects the patch colorimetric value based on the colorimetric value change amounts.

6. The apparatus according to claim 3, wherein the media-dependent variation correction unit includes:
a first medium colorimetric value acquisition unit, configured to acquire a first medium colorimetric value by measuring the medium at a first temperature;
a second medium colorimetric value acquisition unit, configured to acquire a second medium colorimetric value by measuring the medium at a second temperature;
a patch colorimetric value acquisition unit, configured to acquire patch colorimetric value by measuring the target patch of color on the medium at the second temperature;

a medium colorimetric value estimation unit, configured to estimate, based on the first and second medium colorimetric values, a third medium colorimetric value obtained when the medium is measured at the target temperature; and a patch colorimetric value correction unit, configured to correct the patch colorimetric value based on the second and third medium colorimetric values.

7. The apparatus according to claim 6, wherein the second temperature is a temperature of the medium immediately after the target patch of the color is formed.

8. The apparatus according to claim 1, wherein the target temperature acquisition unit acquires the target temperature based on a user instruction.

9. The apparatus according to claim 1, further comprising an image correction unit, configured to correct image data, whose image is to be formed, based on the target patch colorimetric value estimated by the estimation unit.

10. The apparatus according to claim 9, wherein the image correction unit creates a correction table based on the target patch colorimetric value, and corrects the image data based on the correction table.

11. The apparatus according to claim 3, wherein the media-dependent variation correction unit corrects the patch colorimetric value using an approximation formula which expresses a wavelength peak change due to a temperature change on a short wavelength side of a visible light range, and the color material-dependent variation correction unit corrects the patch colorimetric value using an approximation formula which expresses a wavelength change due to a temperature change on a long wavelength side of the visible light range.

12. The apparatus according to claim 3, wherein the patch colorimetric value is a value indicating a spectral reflectance.

13. A color processing method comprising:
a target temperature acquisition step of acquiring a target temperature; and
an estimation step of estimating a target patch colorimetric value that is obtained when a target patch of a color formed on a medium using color material is measured at the target temperature,
wherein the estimation step includes:
a media-dependent variation correction step of correcting, based on a temperature characteristic of the medium, a patch colorimetric value obtained by measuring the target patch of color formed on the medium using the color material at a temperature; and
a color material-dependent variation correction step of correcting, based on temperature characteristic of the color material, the patch colorimetric value corrected in the media-dependent variation correction step to obtain the target patch colorimetric value.

14. A color processing method comprising:
a target temperature acquisition step of acquiring a target temperature; and
an estimation step of estimating a target patch colorimetric value that is obtained when a target patch of color formed on a medium using color material is measured at the target temperature,
wherein the estimation step includes:
a color material-dependent variation correction step of correcting, based on a temperature characteristic of the color material, a patch colorimetric value obtained by measuring the target patch of the color formed on the medium using the color material at a temperature; and
a media-dependent variation correction step of correcting, based on a temperature characteristic of the medium, the patch colorimetric value corrected in the color material-dependent variation correction step to obtain the target patch colorimetric value.

15. The method according to claim 13, wherein in the media-dependent variation correction step, the patch colorimetric value is corrected based on colorimetric value obtained by measuring the medium under a light source which includes an ultraviolet range, and
in the color material-dependent variation correction step, the patch colorimetric value is corrected based on colorimetric value obtained by measuring reference patch of a color using the color material under a light source which does not include any ultraviolet range.

16. A non-transitory computer-readable storage medium storing a program for causing a computer to execute a color processing method, the method comprising:
a target temperature acquisition step of acquiring a target temperature; and
an estimation step of estimating a target patch colorimetric value that is obtained when a target patch of a color formed on a medium using color material is measured at the target temperature,
wherein the estimation step includes:
a media-dependent variation correction step of correcting, based on a temperature characteristic of the medium, a patch colorimetric value obtained by measuring the target patch of the color formed on the medium using the color material at a temperature; and
a color material-dependent variation correction step of correcting, based on a temperature characteristic of the color material, the patch colorimetric value corrected in the media-dependent variation correction step to obtain the target patch colorimetric value.

17. The apparatus according to claim 2, wherein the media-dependent variation correction unit corrects the patch colorimetric value based on a colorimetric value obtained by measuring the medium under a light source which includes an ultraviolet range, and
the color material-dependent variation correction unit corrects the patch colorimetric value based on a colorimetric value obtained by measuring a reference patch of color using the color material under a light source which does not include any ultraviolet range.

18. The apparatus according to claim 17, wherein the color material-dependent variation correction unit corrects the colorimetric value by referring to a table based on data of the target patch of the color, and
the table has information of colorimetric values obtained by measuring the reference patch of the color using the color material at a plurality of temperatures under the light source which does not include any ultraviolet range.

19. The apparatus according to claim 18, wherein the table has information of colorimetric value change amounts per unit temperature interval in association with the reference patch of the color, respectively, and
the color material-dependent variation correction unit calculates colorimetric value change amounts per unit temperature interval of the data of the reference patch of the color using an interpolation arithmetic operation based on the table, and corrects the patch colorimetric values based on the colorimetric value change amounts.

20. The apparatus according to claim 17, wherein the media-dependent variation correction unit includes:
a first medium colorimetric value acquisition unit, configured to acquire a first medium colorimetric value by measuring the medium at a first temperature;

a second medium colorimetric value acquisition unit, configured to acquire a second medium colorimetric value by measuring the medium at a second temperature;

a patch colorimetric value acquisition unit, configured to acquire a patch colorimetric value by measuring the target patch of the color on the medium at the second temperature;

a medium colorimetric value estimation unit, configured to estimate, based on the first and second medium colorimetric values, a third medium colorimetric value obtained when the medium is measured at the target temperature; and a patch colorimetric value correction unit, configured to correct the patch colorimetric value based on the second and third medium colorimetric values.

21. The apparatus according to claim 20, wherein the second temperature is a temperature of the medium immediately after the target patch of the color is formed.

22. The apparatus according to claim 2, wherein the target temperature acquisition unit acquires the target temperature based on a user instruction.

23. The apparatus according to claim 2, further comprising an image correction unit, configured to correct image data, whose image is to be formed, based on the target patch colorimetric value estimated by the estimation unit.

24. The apparatus according to claim 23, wherein the image correction unit creates a correction table based on the target patch colorimetric value, and corrects the image data based on the correction table.

25. The apparatus according to claim 17, wherein the media-dependent variation correction unit corrects the patch colorimetric value using an approximation formula which expresses a wavelength peak change due to a temperature change on a short wavelength side of a visible light range, and the color material-dependent variation correction unit corrects the patch colorimetric value using an approximation formula which expresses a wavelength change due to a temperature change on a long wavelength side of the visible light range.

26. The apparatus according to claim 17, wherein the patch colorimetric value is a value indicating spectral reflectance.

27. The method according to claim 14, wherein in the media-dependent variation correction step, the patch colorimetric value is corrected based on a colorimetric value obtained by measuring the medium under a light source which includes an ultraviolet range, and in the color material-dependent variation correction step, the patch colorimetric value is corrected based on colorimetric value obtained by measuring reference patch of a color using the color material under a light source which does not include any ultraviolet range.

28. A non-transitory computer-readable storage medium storing a program for causing a computer to execute a color processing method, the method comprising:

a target temperature acquisition step of acquiring a target temperature; and an estimation step of estimating a target patch colorimetric value that is obtained when a target patch of a color formed on a medium using color material is measured at the target temperature, wherein the estimation step includes:

a color material-dependent variation correction step of correcting, based on temperature characteristic of the color material, a patch colorimetric value obtained by measuring the target patch of the color formed on the medium using the color material at a temperature; and a media-dependent variation correction step of correcting, based on a temperature characteristic of the medium, the patch colorimetric value corrected in the color material-dependent variation correction step to obtain the target patch colorimetric value.

* * * * *